Oct. 22, 1946.     F. G. NOBLE     2,409,691
METHOD FOR RECOVERING VOLATILE HYDROCARBONS FROM GASES
Filed Jan. 28, 1943
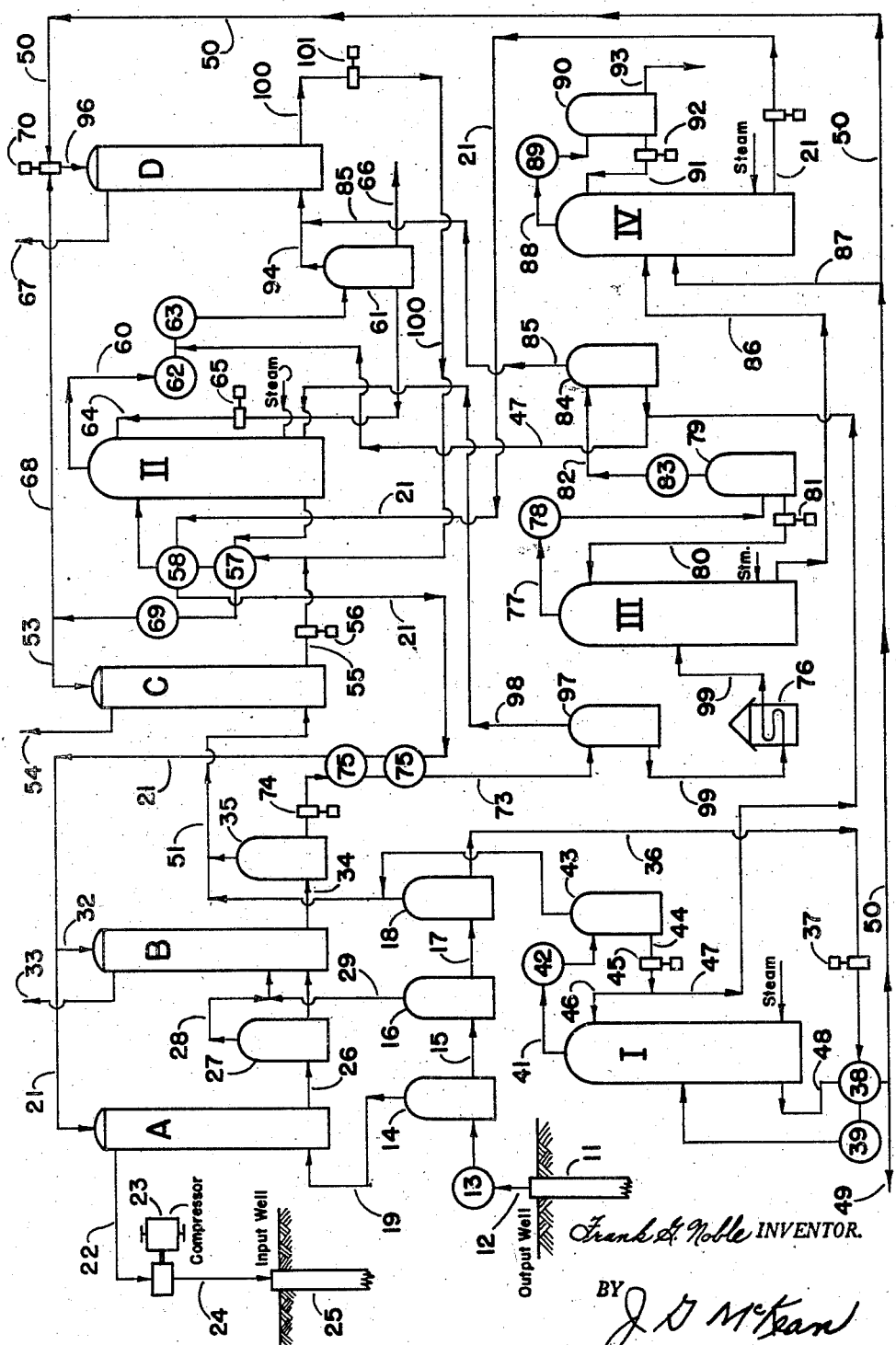
Frank G. Noble INVENTOR.
BY J. D. McKean
ATTORNEY

UNITED STATES PATENT OFFICE 2,409,691

METHOD FOR RECOVERING VOLATILE HYDROCARBONS FROM GASES

Frank G. Noble, Houston, Tex., assignor to Standard Oil Development Company, a corporation of Delaware Application January 28, 1943, Serial No. 473,796

3 Claims. (Cl. 196—8)

The present invention is directed to a method for recovering condensible hydrocarbons from distillate gas.

In the recovery of condensible hydrocarbons from natural gas it is desirable to obtain maximum yields at the minimum of expense. The present invention is directed to a method of recovering such hydrocarbons at a low cost of operation.

The method of the present invention may be described briefly as including the steps of cooling and reducing the pressure on the output of a distillate well to separate a condensate, contacting the uncondensed material with heavy absorption oil, flashing the condensate to separate vapors from it and removing vapors from the rich heavy absorption oil, combining the vapors from these two sources and contacting them with a light absorption oil. The rich light absorption oil is then sent to a recovery still operated at relatively high temperatures and pressures to reduce the amount of stripping steam required, and vapors removed from this still are passed to a reabsorber to effect a further recovery.

It is generally desirable to separate the condensible hydrocarbons from a distillate well at a very high pressure so that the gas from the well may be compressed with a minimum of expenditure of energy and returned to the formation. The temperature and pressure conditions for this high pressure operation are such that it is impossible to use light absorption oils for the reason that a large portion of them would be vaporized and swept out of the system by the natural gas.

It is a feature of the present invention that a heavy oil is used for absorbing the condensible hydrocarbons in the high pressure portion of the cycle and that a light absorption oil is used to absorb rich vapors which have been flashed at low pressures. The employment of a light oil in the low pressure step reduces substantially the amount of absorption oil required to be recirculated.

It is a further advantage of the present invention that the absorbed constituents from the rich light absorption oil are recovered at a relatively high temperature and pressure thereby reducing to a minimum the amount of stripping steam and size of still required. An efficiency in recovery is obtained concurrently with this operating economy by sending the light ends taken overhead in the light oil recovery step to a reabsorber and recycling the additional rich oil from the reabsorber to the light oil recovery step.

An additional advantage in the method of the present application is the arrangement of fluid flow to obtain a maximum utilization of the heat employed and to reduce to a minimum the requirements for heat, stripping steam and cooling water.

Other advantages and objects of the present invention may be seen from a reading of the following description taken in conjunction with the drawing in which the sole figure is in the form of a flow sheet diagrammatically illustrating a preferred method and operation.

Turning now specifically to the drawing, fluid produced by a condensate well 11 is conducted by line 12 through cooler 13 and discharged into separator 14. Condensate from separator 14 is fed by line 15 to a second separator 16 maintained at a lower pressure and liquid remaining in separator 16 is led via line 17 to separator 18 maintained at a still lower pressure.

Vapors from the first separator 14 are led overhead via line 19 into high pressure absorber A where they are contacted with a heavy lean absorption oil discharged into the upper portion of the absorber by line 21. Unabsorbed gases are removed from the top of absorber A via line 22, passed through compressor 23 and returned to the producing formation via line 24 and injection well 25.

Rich absorption oil from absorber A flows through line 26 to flash chamber 27. Overhead from the flash chamber is removed via line 28, combined with vapors flashed from the condensate in chamber 16 in line 29 and discharged into low pressure absorber B. Heavy lean absorption oil withdrawn from line 21 by branch line 32 discharges into the upper portion of absorber B and unabsorbed gases are withdrawn from the upper portion of the absorber by line 33. Rich oil from the bottom of absorber B is sent by line 34 to flash chamber 35. Condensate from the bottom of flash chamber 18 is withdrawn through line 36 provided with pump 37, heat exchanger 38 and heater 39 and discharged into still I. Overhead from the still is withdrawn through line 41 provided with condenser 42 and discharged into reflux accumulator 43. Liquid from the accumulator is removed through line 44 provided with pump 45 and is split, a portion being sent via line 46 to the upper portion of a still as reflux and the other portion being discharged into line 47.

Bottoms from still I may be withdrawn by line 49 and heat exchanged with incoming liquid in heat exchanger 38 and then either withdrawn from the system via line 49 or discharged into line 50.

Line 51 is fluidly connected with the upper portion of flash chamber 18, reflux accumulator 43 and flash chamber 35. The rich vapors from these three sources are discharged by line 51 into the lower portion of low pressure absorber C where they are contacted with a light absorption oil passed into the upper portion of the absorber via line 53. Unabsorbed vapors are removed from the upper portion of absorber C via line 54 while the rich light absorption oil is discharged through line 55 containing pump 56 and passes through heat exchangers 57 and 58 and into still II.

Overhead from still II is withdrawn via line 60, commingled with condensate withdrawn from accumulator 43 by line 47 and subsequently discharged into reflux receiver 61. It is preferred to arrange two coolers in line 60, one cooler 62 for cooling the overhead and a second cooler 63 arranged to cool the commingled mixture of overhead and the condensate from accumulator 43. From reflux receiver 61 vapors may be withdrawn by line 94 to a lower portion of reabsorber D and liquid may either be returned to still II as reflux using line 64 and pump 65, or else may be withdrawn via line 66 to a stabilizer (not shown). Unabsorbed gases pass out of the top of reabsorber D via line 67.

Lean light absorption oil may be withdrawn from the bottom of still II via line 68 and after passing through heat exchangers 57 and cooler 69 may be discharged via branch line 53 into absorber C or if desired may be forced into the upper portion of reabsorber D by branch line 96 and pump 70. If desired, the absorption oil for absorber D may be withdrawn from the lower portion of still I via line 50 and branch line 96. Rich absorption oil is withdrawn from absorber D through line 100 containing pump 101 and mixed in pipe 55 with the rich oil being conducted from absorber C to still II.

The rich heavy absorption oil used in the high pressure absorbers and accumulated in chamber 35 may be recovered in a distillation system including stills III and IV. The rich oil is withdrawn from the bottom of chamber 35 via line 73 and pump 74 and is passed through heat exchangers 75 where it is heat exchanged with lean heavy absorption oil being sent to the absorbers via line 21. The heat exchanged rich absorption oil now passes through line 73 to flash chamber 97 where the vapors are removed via line 98 and passed to a lower portion of light oil still II where they aid in the stripping of the still. The hot liquid from the bottom of flash chamber 97 is withdrawn via line 99 in which is arranged a direct fired heater 76, to further increase the temperature of the liquid and then discharged into still III.

Overhead from still III is withdrawn via line 77 containing cooler 78 and discharged into accumulator 79. From accumulator 79 liquid is returned to the still as reflux via line 80 containing pump 81. Vapors from vessel 79 are withdrawn via line 82 containing a cooler 83 and discharged into accumulator 84. Vapors from accumulator 84 flow through line 85 and commingle with the vapors from the light oil still in line 94 and pass with the vapors into reabsorber D. Liquid is discharged from the bottom of vessel 84 into line 47 so that it admixes with reflux accumulated in vessel 43 and in turn mixes with the condensate taken overhead from still II.

Bottoms from still III are passed by line 86 to low pressure still IV. Lean oil is withdrawn from the lower portion of low pressure still IV via line 21 and is returned to the high pressure absorbers A and B previously described. Make-up heavy absorption oil is provided by bottoms withdrawn from condensate still I via line 50, a portion of these bottoms being conveyed by branch line 87 to still IV. Vapors are removed from the upper portion of still IV by line 88, passed through cooler 89 and into accumulator 90. The condensate from vessel 90 may be returned as reflux to still IV by line 91 containing pump 92 and any excess may be withdrawn to storage (not shown) by line 93.

It will be understood that if desired steam may be injected into still II to aid in stripping. Due to the efficient utilization of heat, however, it will be found that very little or no stripping steam is necessary in operating this still.

As a specific example of suitable conditions for operating the present invention a 37° A. P. I., 207 average molecular weight oil may be employed as the heavy absorption oil in absorbers A and B. A 49° A. P. I., 140 average molecular weight oil may be employed as the light absorption oil utilized in vessels C and D. If these oils are employed in the system, absorber C may be operated efficiently at a pressure of 35 pounds, still II at a pressure of 90 pounds and a feed temperature of 430° F. and reabsorber D at a pressure of 85 pounds per square inch gauge. In the recovery system flash chamber 97 may be operated at a pressure of 130 pounds per square inch gauge and temperature of 430° F. and still III may be under a pressure of 90 pounds per square inch and a temperature of 520° F. The low pressure still IV may be operated at a pressure of 10 pounds per square inch and a bottom temperature of 480° F. It will be seen that substantially the entire heat input required is the heat necessary to raise the temperature of the rich heavy absorption oil from 430° F. to 520° F. in direct fired heater 76, and that the hot vapors from vessel 97 are at a sufficient temperature and pressure to serve as the stripping medium in still II.

Having fully described the present invention, what I desire to claim is:

1. A method for recovering distillate from high pressure gas which comprises cooling the gas under a high pressure to form a condensate fraction and a gaseous fraction, separating said fractions, contacting said gaseous fraction with lean heavy absorption oil to form a rich heavy absorption oil, flashing vapors from said rich heavy absorption oil and from said condensate and combining said vapors, contacting said combined vapors, contacting said combined vapors with lean light absorption oil to form rich light absorption oil, increasing the pressure and temperature of said rich light absorption oil and passing it to a distillation zone, removing a lean light absorption oil from a lower portion of said distillation zone and vapors from an upper portion of said distillation zone, cooling said vapors to form a liquid fraction and a gaseous fraction and passing them to a separating zone, separating said gaseous fraction and contacting it with a lean light absorption oil to form a second rich light absorption oil, passing said rich light absorption oil to said distillation zone, removing a portion of the liquid from said separating zone and returning it to said distillation zone as reflux, increasing the temperature of said rich heavy absorption oil, and passing it to a second separating zone to separate a liquid fraction and a vaporous fraction, passing said separated vaporous fraction to said distillation zone to aid in the separation of lean light absorption oil, and absorbed constituents, heating the liquid from said second separating zone to a high temperature and distilling it to recover a lean heavy absorption oil.

2. A method in accordance with claim 1 in which the lean heavy absorption oil has an average molecular weight of approximately 207 and the lean light absorption oil has an average molecular weight of approximately 140.

3. A method for recovering distillate from high pressure gas, comprising the steps of contacting said gas with lean heavy oil in an absorption zone to form a rich heavy oil, flashing vapors from said rich absorption oil, passing said vapors to a second absorption zone and contacting them with a lean light absorption oil to form a rich light absorption oil, heating said rich heavy absorption oil, passing said heated heavy absorption oil to a separating zone to separate a vaporous fraction and a liquid fraction, passing said liquid fraction to a distillation zone to separate absorbed constituents as overhead and a lean heavy absorption oil as bottoms, passing said rich light absorption oil to a second distillation zone and separating absorbed constituents as overhead and a lean light absorption oil as bottoms, and passing vapors from said separating zone to said second distillation zone to aid in stripping absorbed constituents from said light absorption oil.

FRANK G. NOBLE.